(12) United States Patent
Choi

(10) Patent No.: US 11,050,981 B2
(45) Date of Patent: Jun. 29, 2021

(54) VEHICLE AND METHOD OF CONTROLLING THE SAME

(71) Applicants: Hyundai Motor Company, Seoul (KR); Kia Motors Corporation, Seoul (KR)

(72) Inventor: JunHyuk Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/813,204

(22) Filed: Mar. 9, 2020

(65) Prior Publication Data

US 2021/0076009 A1  Mar. 11, 2021

(30) Foreign Application Priority Data

Sep. 9, 2019  (KR) .......................... 10-2019-0111191

(51) Int. Cl.
*B62D 1/04* (2006.01)
*B60K 23/00* (2006.01)
(Continued)

(52) U.S. Cl.
CPC ............. *H04N 7/188* (2013.01); *B60K 23/00* (2013.01); *B60R 1/00* (2013.01); *B60R 11/04* (2013.01); *B62D 1/046* (2013.01); *G06K 9/00711* (2013.01); *G06K 9/00805* (2013.01); *G08G 1/168* (2013.01); *B60R 2300/105* (2013.01); *B60R 2300/20* (2013.01); *B60R 2300/802* (2013.01); *B60R 2300/806* (2013.01); *B60R 2300/8093* (2013.01); *G06K 2009/00738* (2013.01); *G06K 2209/23* (2013.01); *H04N 5/247* (2013.01)

(58) Field of Classification Search
CPC ...................................................... H04N 7/188
See application file for complete search history.

(56) References Cited

U.S. PATENT DOCUMENTS 6,141,611 A * 10/2000 Mackey ................. G07C 5/008
340/438
7,348,895 B2 * 3/2008 Lagassey ............... G07C 5/008
340/907

(Continued)

FOREIGN PATENT DOCUMENTS

KR  10-2014-0128832 A  11/2014

*Primary Examiner* — Irfan Habib
(74) *Attorney, Agent, or Firm* — Mintz Levin Cohn Ferris Glovsky and Popeo, P.C.; Peter F. Corless

(57) ABSTRACT

A method of controlling a vehicle having a plurality of cameras having different viewing angles with respect to front, rear, left and right directions is provided. The method includes when an image obtainment command is received through an inputter, obtaining an image obtained by the cameras having the viewing angle with respect to at least one of left and right sides as an event image of a traffic accident of another vehicle. The event image of the obtained traffic accident of the other vehicle is transmitted to an external device. When the vehicle is in a parking state, the image obtained by the camera having the viewing angle with respect to at least one of the front and rear is obtained as the event image for parking, and the event image for parking is transmitted to a user terminal registered in advance.

19 Claims, 9 Drawing Sheets

(51) Int. Cl.
  *B60R 11/04* (2006.01)
  *G06K 9/00* (2006.01)
  *H04N 7/18* (2006.01)
  *G08G 1/16* (2006.01)
  *B60R 1/00* (2006.01)
  *H04N 5/247* (2006.01)

(56) References Cited

U.S. PATENT DOCUMENTS

| | | | | |
|---|---|---|---|---|
| 7,362,215 | B2* | 4/2008 | Janssen | G08G 1/166 340/425.5 |
| 7,537,400 | B2* | 5/2009 | Schmid | B60R 1/00 348/148 |
| 8,836,784 | B2* | 9/2014 | Erhardt | G07C 5/008 348/148 |
| 9,773,177 | B2* | 9/2017 | Takemura | G06K 9/00798 |
| 10,011,230 | B1* | 7/2018 | Brown | H04N 5/2252 |
| 10,089,531 | B2* | 10/2018 | Lee | H04N 5/23293 |
| 10,121,379 | B2* | 11/2018 | Lee | B60R 1/00 |
| 10,521,894 | B2* | 12/2019 | Yokota | G06T 11/00 |
| 2002/0063781 | A1* | 5/2002 | Aizawa | H04N 5/772 348/211.99 |
| 2008/0023253 | A1* | 1/2008 | Prost-Fin | B60N 2/42763 180/400 |
| 2008/0165251 | A1* | 7/2008 | O'Kere | G07C 5/0891 348/148 |
| 2008/0198226 | A1* | 8/2008 | Imamura | G06K 9/00805 348/148 |
| 2008/0297330 | A1* | 12/2008 | Jeon | B60R 25/25 340/426.11 |
| 2009/0024309 | A1* | 1/2009 | Crucs | G07C 5/0841 701/118 |
| 2010/0066527 | A1* | 3/2010 | Liou | B60Q 9/008 340/461 |
| 2011/0317014 | A1* | 12/2011 | Onaka | B60R 1/00 348/148 |
| 2012/0062745 | A1* | 3/2012 | Han | G08G 1/167 348/148 |
| 2012/0069153 | A1* | 3/2012 | Mochizuki | H04N 7/181 348/47 |
| 2012/0229645 | A1* | 9/2012 | Yamada | B60Q 1/32 348/148 |
| 2014/0192195 | A1* | 7/2014 | Su | G06K 9/4661 348/148 |
| 2014/0324247 | A1* | 10/2014 | Jun | G07C 5/0866 701/1 |
| 2015/0109446 | A1* | 4/2015 | Takano | H04N 7/18 348/148 |
| 2015/0286878 | A1* | 10/2015 | Molin | H04N 5/2624 348/148 |
| 2017/0006234 | A1* | 1/2017 | Higuchi | G06T 3/4038 |
| 2019/0019035 | A1* | 1/2019 | Lee | H04M 1/72403 |
| 2020/0118294 | A1* | 4/2020 | Nakao | B60R 11/04 |

* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0111191, filed on Sep. 9, 2019, the disclosure of which is incorporated by reference in its entirety.

TECHNICAL FIELD

The disclosure relates to a vehicle for obtaining an external image, and a method of controlling the vehicle, and more particularly to a vehicle that obtains an external image by selecting a camera based on state information and surrounding information of the vehicle.

BACKGROUND

Vehicles perform basic driving functions and additional functions for user convenience, for example, an audio function, a video function, a navigation function, an air-conditioning control function, a seat heating function, an external image obtainment function (black box function), a communication function with an external terminal, and the like.

The external image obtainment function may include a function of obtaining an image of the rear side while parking and a function of obtaining an image of the front side of the vehicle while driving. In other words, the vehicle may obtain the image of the rear side while parking, perform a parking assistance function by displaying the obtained image, obtain the image of the front side while driving, and store the obtained image so that it can be used for analyzing the cause of an accident in the event of the collision. In addition, when the vehicle is being driven under an autonomous driving function, the vehicle may use the obtained front image as information for autonomous driving.

SUMMARY

Therefore, the disclosure provides a vehicle that selects at least one of a plurality of cameras based on state information and surrounding information of the vehicle and stores an image obtained from the selected at least one camera as an event image, and a method of controlling the vehicle.

Another aspect of the disclosure provides a vehicle that stores the image obtained from at least one camera as the event image based on a user input and shares the stored event image, and a method for controlling the vehicle. Additional aspects of the disclosure will be set forth in part in the description which follows and, in part, will be obvious from the description, or may be learned by practice of the disclosure.

In accordance with an aspect of the disclosure, a vehicle may include a plurality of cameras each having identification information, configured to obtain images in different directions; an inputter configured to receive a user input; a controller configured to recognize the identification information and event information of the camera based on the received user input, to obtain the image obtained using at least one camera as an event image based on the recognized identification information, and to match and store image information of the obtained event image with the recognized event information; and a storage configured to store the image information and the event information in response to a control command of the controller.

The storage may include a plurality of databases. The controller may be configured to store the image information in the database having the recognized event information among the plurality of databases. The vehicle may further include a terminal provided with a display and a cluster. The controller may be configured to obtain the image obtained using one or more cameras of the plurality of cameras as the event image when the received user input is an image obtainment command, to operate the cluster to display the operation information of the camera that obtained the event image, to operate the terminal to display the obtained event image when the received user input is an image storage command, and to store the event image displayed on the terminal.

The vehicle may further include a position receiver configured to receive position information corresponding to a current position. The controller may be configured to identify time information when storing image information of the event image, and to match and store at least one of the identified time information and the received position information with the image information. The inputter or input device may include at least one of a left multi-function switch and a right multi-function switch provided around a steering wheel.

The plurality of cameras may include a first camera configured to obtain a front image and a second camera configured to obtain a rear image. The controller may be configured to obtain the image obtained using at least one of the first camera and the second camera as the event image for parking when the vehicle is in a parking state. Additionally, the controller may be configured to determine that the vehicle is in the parking state when a shift lever is positioned at a parking stage or an engine is turned off.

The vehicle may further include a collision detector configured to output collision information regarding the collision detection. The controller may be configured to activate the plurality of cameras when the collision information is received from the collision detector in the parking state, to obtain the image for a predetermined time using the plurality of cameras, and to store the image obtained for the predetermined time as the event image. The vehicle may further include a communicator configured to communicate with a terminal registered in advance. The controller may be configured to transmit the image obtained for the predetermined time to the terminal registered in advance.

The plurality of cameras may include a third camera configured to obtain a left image and a fourth camera configured to obtain a right image. When the received event information is event information regarding a traffic accident of another vehicle, the controller may be configured to obtain the image obtained using the camera corresponding to the recognized identification information of the third camera and the fourth camera as the event image.

Further, the plurality of cameras may include a third camera configured to obtain a left image and a fourth camera configured to obtain a right image. When the received event information is event information regarding a trip, the controller may be configured to obtain the image obtained through the camera corresponding to the recognized identification information of the third camera and the fourth camera as the event image. The vehicle may further include a communicator configured to communicate with an external device. The controller may be configured to transmit the obtained event image to the external device.

In accordance with another aspect of the disclosure, a vehicle may include a plurality of cameras having viewing angles with respect to front, rear, left and right directions; a collision detector configured to output collision information regarding collision detection, a communicator configured to communicate with at least one of an external device and a user terminal; a controller configured to obtain an image obtained using the camera having the front or rear viewing angle as an event image for parking when the vehicle is in a parking state, to activate the plurality of cameras when the collision information is received from the collision detector while parking, and to obtain the image obtained using the plurality of cameras as an event image for a traffic accident; and a storage having a plurality of databases configured to store the event image for the parking and the event image for the traffic accident.

The vehicle may further include the communicator configured to receive position information corresponding to a current position, and to communicate with the external device. The controller may be configured to analyze images obtained by the plurality of cameras to determine whether there is the traffic accident of another vehicle, and in response to determining that the traffic accident of the another vehicle has occurred, to match the obtained image with the received position information and transmit the image to the external device.

The vehicle may further include the communicator configured to receive position information corresponding to a current position, and to communicate with the user terminal. In response to determining that the current position is a region of interest based on the received position information, the controller may be configured to match the image obtained using at least one of the plurality of cameras with the received position information and transmit the image to the user terminal.

In accordance with another aspect of the disclosure, in a method of controlling a vehicle, the vehicle may include a plurality of cameras having different viewing angles with respect to front, rear, left and right directions. The method may include when an image obtainment command is received through an input device, obtaining, by a controller, an image obtained by the camera having the viewing angle with respect to at least one of left and right sides obtained as an event image of a traffic accident of another vehicle; transmitting, by the controller, the event image of the obtained traffic accident of another vehicle to an external device; and when the vehicle is in a parking state, obtaining, by the controller, the image obtained by the camera having the viewing angle with respect to at least one of the front and rear obtained as the event image for parking, and transmitting the event image for parking to a user terminal registered in advance.

The method may further include when the image obtainment command is received, displaying, by a display, information of the camera configured to obtain the event image of the traffic accident of another vehicle is displayed; when an image storing command is received through the input device, displaying the event image of the traffic accident of another vehicle through the display of a vehicle terminal, and storing, by a storage, image information of the displayed event image.

The method may further include storing, by the storage, image information of the event image of the traffic accident of another vehicle or the event image of the parking, respectively; and matching and storing, by the controller, time information of a time point at which each event image is obtained and the position information of the vehicle with the image information when storing the image information. The method may further include determining, by the controller, the parking state when a shift lever is positioned at a parking stage or an engine is turned off.

Additionally, the method may include when collision information is received from a collision detector while parking, activating, by the controller, the plurality of cameras; obtaining, by the controller, images obtained using the plurality of cameras as the event image of the traffic accident of the vehicle; storing, by the storage, the event image of the traffic accident of the vehicle; and transmitting, by the controller, the event image of the traffic accident of the vehicle to the user terminal registered in advance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
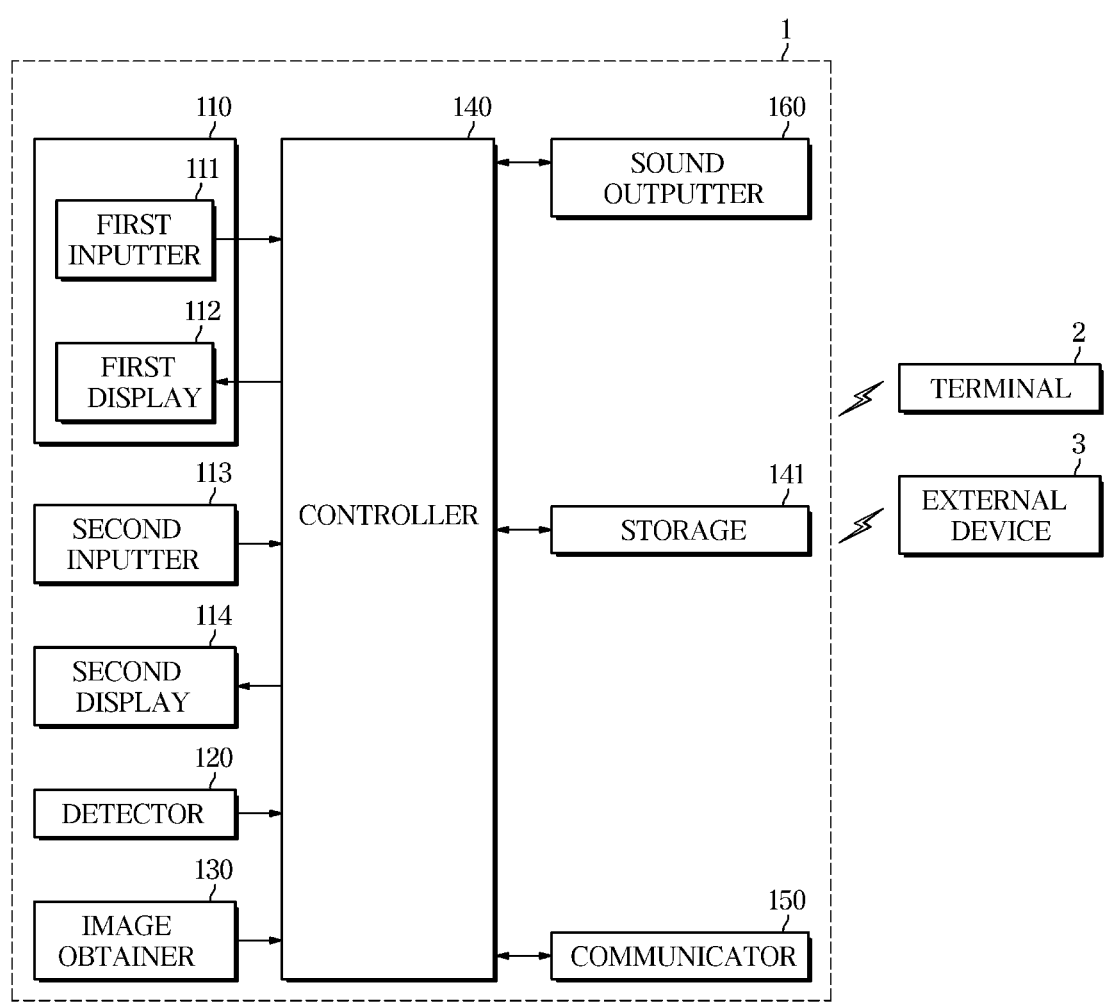
FIG. 1 is a control block diagram of a vehicle according to exemplary embodiments of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of exemplary embodiments of the disclosure will be described, and description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network. Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise. An identification code is used for the convenience of the description but is not intended to illustrate the order of each step. Each of the steps may be implemented in an order different from the illustrated order unless the context clearly indicates otherwise.

Figure 2:
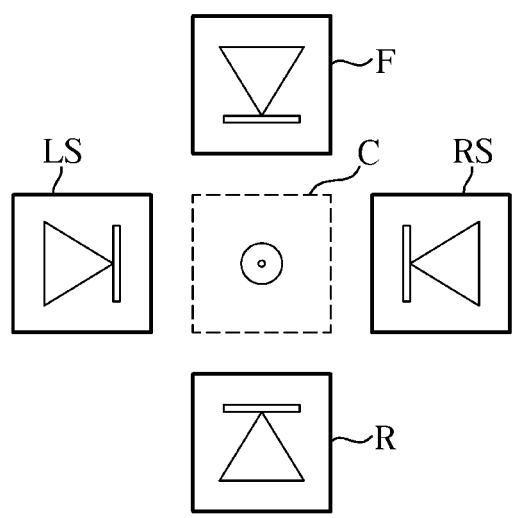
FIG. 2 is a view illustrating a second inputter provided in a vehicle according to exemplary embodiments of the disclosure.
Figure 3:
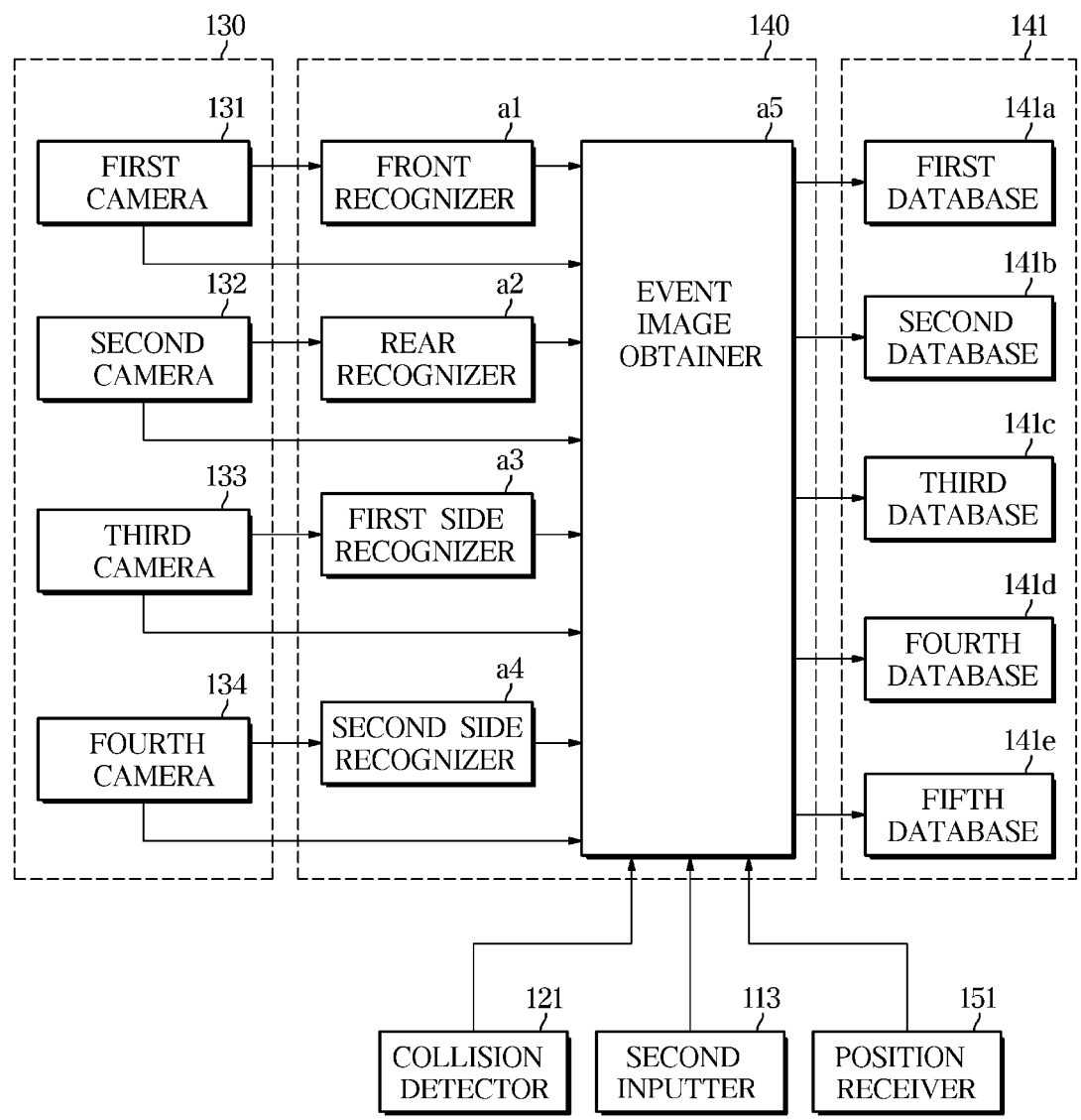
FIG. 3 is a detailed block diagram illustrating an image obtainer, a controller, and a storage of the vehicle illustrated in FIG. 1 according to exemplary embodiments of the disclosure.

The principle and exemplary embodiments of the disclosure will now be described with reference to the accompanying drawings. FIG. 1 is a control block diagram of a vehicle according to exemplary embodiments of the disclosure, FIG. 2 is a view illustrating a second inputter provided in a vehicle according to exemplary embodiments of the disclosure, and FIG. 3 is a detailed block diagram illustrating an image obtainer, a controller, and a storage of the vehicle illustrated in FIG. 1. The methods described herein may be executed by the controller configured to operate the other components of the system.

Referring to FIG. 1, a vehicle 1 may include a vehicle terminal 110, a second inputter (e.g., second input device) 113, a second display 114, a detector 120, an image obtainer 130, a controller 140, a storage 141, a communicator 150 and a sound outputter 160 (e.g., sound output device). The vehicle terminal 110 may be configured to display an image of at least one function selected by a user among an audio function, a video function, a navigation function, a broadcasting function (DMB function), a radio function, a content play function, and an internet search function.

The vehicle terminal 110 may be installed on the dashboard either in a landfill or in a cradle. Additionally, the vehicle terminal 110 may include a first display 112 and may further include a first inputter 111 (e.g., first input device). In other words, the vehicle terminal 110 may include a display panel as the first display 112 and may further include a touch panel as the first inputter 111. The vehicle terminal 110 may be implemented as a touch screen in which a touch panel is integrated with the display panel.

The first inputter 111 of the vehicle terminal 110 may be configured to receive an operation command of various functions capable of being performed in the vehicle 1. The first inputter 111 may be configured to receive an image search and image playback command Additionally, the first inputter 111 may be configured to receive at least one of a high quality image playback command, a low quality image playback command, a top view image playback command, and an around view image playback command. The first inputter 111 may also be configured to receive at least one of time, place, and position information where the image is stored during image search and image playback. The first inputter 111 may also be configured to receive an image deletion command.

Further, the first inputter 111 may be configured to receive an on command and an off command of a navigation mode, and receive destination information. The first inputter 170 may also include a jog dial or touch pad for a user to input a command to move or select a cursor displayed on the first display 112. In particular, the jog dial or the touch pad may be disposed in the center fascia or the like. The first display 112 may be configured to display information of various functions capable of being performed in the vehicle 1, information of various functions that are performed in the vehicle 1, and display information corresponding to a user input. The first display 112 may be configured to display the image stored in the storage 141 in response to the user input. The first display 112 may be configured to display the around view image or the top view image when the image stored in the storage 141 is displayed.

When the navigation mode is performed, the first display 112 may be configured to display a map image within a predetermined range from a current position of the vehicle 1. When the destination information is input, the first display 112 may be configured to display the map information matching path information from the current position to the destination, and display path guidance information. The first display 112 may also be configured to display the current position of the vehicle 1 when a map display mode is selected, and display the map image within the predetermined range from the current position of the vehicle 1.

The second inputter 113 may be configured to receive an image obtainment command and event information and position information of cameras. The event information may be information regarding an event name. The second inputter 113 may be provided in at least one of a steering wheel, an operation lever (i.e., left and right multi-function switches) surrounding the steering wheel (e.g., along the circumference of the steering wheel), a head unit, and a center fascia. The second inputter 113 may be provided with at least one of a button, a switch, and a key. An example of the second inputter 113 will be described with reference to FIG. 2.

When the cameras are disposed on the front, rear and left and right sides of the vehicle 1, the plurality of second inputters 113 may include a first button F for receiving an image obtainment command of a front camera and a second button R for receiving an image obtainment command of a rear camera, a third button LS for receiving an image obtainment command of a left camera, and a fourth button RS receiving an image obtainment command of a right camera.

The first button F, the second button R, the third button LS, and the fourth button RS may be arranged in a cross shape. The first button F may be provided on the upper side of the cross shape, the second button R may be provided on the lower side of the cross shape, the third button LS may be provided on the left side of the cross shape, and the fourth button RS may be provided on the right side of the cross shape. In addition, the second inputter 113 may further include a fifth button C disposed at the center of the cross shape, and the fifth button C disposed at the center may be configured to receive a selection command, a cancel command, a delete command, a transmission command, and the like of the event information.

When the second inputter 113 is implemented as a multi-function switch around the steering wheel, the multi-function switch may move up, down, left and right, and may be configured to transmit the image obtainment command to the camera mounted at a position corresponding to the moving direction. The second inputter 113 may be configured to receive information regarding a transmission target and information of the image to be transmitted. Particularly, the transmission target may be a terminal 2 of a user or a terminal of the acquaintance of the user. The transmission target may be a server such as a police station, a fire station, an emergency medical center, or the like as an external device 3, or may be a cloud server.

The information regarding the transmission target may include at least one of a telephone number, an email address, and a website link address. The second inputter 113 may include a keypad. The second inputter 113 may also be configured to receive a number of snapshots of the image to be transmitted. In particular, the information regarding the transmission target and the information of the image to be transmitted may be input through the first inputter 111. The second display 114 may be configured to display input information that corresponds to an input of the second inputter 113 and result information that corresponds to the input of the second inputter 113.

For example, the second display 114 may be configured to display at least one of image obtainment command reception information, camera information, image obtainment success information, image storage success information, image storage failure information, image transmission rate information, image transmission success information, image transmission failure information, emergency transmission information, and event information corresponding to the obtained image. The event information corresponding to the obtained image may be information that corresponds to the event name, and may be position information of a database in which the image is stored.

The second display 114 may be configured to display the information regarding the transmission target and the information of the image to be transmitted. The information of the image to be transmitted may include at least one of time information at which the image is obtained, position information of the vehicle 1 at the time when the image is obtained, and the event information. The second display 114 may be provided in the head unit or may be provided in the cluster. The second display 114 may be a head up display (HUD).

Furthermore, the detector 120 may be configured to detect driving information of the vehicle 1. The detector 120 may further include a speed detector configured to detect a driving speed of the vehicle 1. The speed detector may include a plurality of wheel speed sensors respectively mounted on a plurality of wheels of the vehicle 1, and may include an acceleration sensor configured to detect an acceleration of the vehicle 1. The detector 120 may also be configured to detect objects around the vehicle 1. The detector 120 may include a distance detector configured to detect a distance to the object around the vehicle 1.

The distance detector may be mounted in front, rear, left and right of the exterior of the vehicle 1, respectively. This distance detector may include a light detection and ranging (LiDAR) sensor. The LiDAR sensor is a contactless distance detection sensor using a principle of laser radar. The distance detector may include an ultrasonic sensor or a radio detecting and ranging (RaDAR) sensor. Additionally, the detector 120 may include a collision detector 121 (see FIG. 3) configured to output a collision signal that corresponds to a collision with an obstacle. The collision detector may be at least one of a pressure sensor, a force sensor, a limit switch, a proximity sensor, an Arduino impact sensor, a vibration sensor, a touch sensor, an acceleration sensor, and a yaw rate sensor. However, the collision detector is not limited to these examples.

The image obtainer 130 may be configured to obtain a road image around the vehicle 1 in real time. The image obtainer 130 may include a plurality of cameras configured to obtain images in front, rear, left, and right directions of the vehicle 1, that is, images in different directions. The plurality of cameras may have different viewing angles. The camera may include a charge-coupled device (CCD) or a complimentary metal-oxide semiconductor (CMOS) image sensor and may include a 3D spatial recognition sensor such as a KINECT (RGB-D Sensor), a TOF (Structured Light Sensor), a stereo camera, and the like.

The image obtainer 130 may include at least one rotatable camera. The image obtainer 130 may include a camera provided in a black box, may include a camera of an autonomous driving control apparatus for autonomous driving, and may include a camera for detecting the obstacle. The image obtainer 130 may include a camera of a peripheral monitoring device (SVM: Surround View Monitor, or AVM), and may include a camera of a blind spot detection (BSD) or a camera of a rear detector. Each camera of the image obtainer 130 may be a wide angle camera.

The controller 140 may be configured to identify the current position of the vehicle when the on command of the navigation mode is received through the first inputter 111 and the destination information is received via user input, and generate the path information from the current position to the destination based on the current position information and the destination information. The controller 140 may be configured to match the path information generated in the map information, adjust the output of the matched map information and the path information, and output the path guidance information.

The controller 140 may be configured to generate and output a plurality of different path information when the path information is generated, store one path information selected by the user among the plurality of different path information, and perform the navigation function based on the stored path information. The controller 140 may be configured to operate the sound outputter 160 to output the sound of the image displayed on the first display 112. The controller 140 may be configured to identify the driving speed of the vehicle 1 in real time and operate the first display 112 to display the identified driving speed and the current position as navigation information.

Additionally, the controller 140 may be configured to operate the first display 112 to display a rear image when a shift lever is positioned at the reverse driving stage (R) while parking is being performed. The controller 140 may be configured to synthesize the images obtained from the plurality of cameras to generate a top view image and operate the first display 112 to display the generated top view image. Particularly, the synthesized images may include images obtained at the same viewpoint by the plurality of cameras having different photographing views.

The top view image may be the image in which images corresponding to information of the object are matched to front, rear, left, and right regions based on a symbol image of the vehicle itself (hereinafter, referred to as "subject vehicle"). The image corresponding to the information of the object may include a symbol image of the object corresponding to a type of the object, and may further include a tag image that indicates additional information of the object around the symbol image of the object. The additional information may include at least one of speed information, position information, and number information of the object.

When the top view image playback command is received via the first inputter 111, the controller 140 may be configured to obtain a front image, a rear image, a left side image, and a right side image having time information input to the first inputter 111 among images stored in the storage 141, and obtain the information of the object having the input time information and the driving information, generate the top view image based on the obtained information of each direction, the information of the object, and the driving information, and operate the first display 112 to display the generated top view image. When the time information and the transmission command are received via the first inputter 111, the controller 140 may be configured to search the image information having the time information and transmit the searched image information to the terminal 2 or the external device 3.

The controller 140 may be configured to operate the at least one of the plurality of cameras of the image obtainer 130 in response to the user input received by the second inputter 113 to perform image capturing (i.e., image obtainment), and store the obtained image information in the storage 141. The controller 140 may be configured to identify at least one of the driving speed information, position information, and time information and store the at least one identified information together in the storage 141.

The user input received by the controller 140 may include at least one identification information of the plurality of cameras, and may include the event information. For example, when a left multi-function switch or a right multi-function switch of the multi-function switches in the direction that the user desires to capture is operated, an operation signal of the activated multi-function switch may be transmitted to the controller 140. At this time, the controller 140 may be configured to operate the cluster to display operation information of the camera corresponding to the operation signal. When the operation signal is received from a passing switch, the controller 140 may be configured to operate a display of the terminal 2 to display the image obtained by the camera and store the obtained image. When the operation signal is received from a previously provided transmission button, the controller 140 may be configured to transmit the stored image to the external device 3.

The controller 140 may be configured to operate at least one of the plurality of cameras of the image obtainer 130 to automatically perform image capturing (i.e., image obtainment) based on the driving speed information, the current position information, startup on/off information, position information of the shift lever, and collision information output by the collision detector 121, and store the information of the automatically obtained image in the storage 141. The controller 140 may be configured to identify at least one of the driving speed information, position information, and time information and store the at least one identified information together in the storage 141.

Additionally, the controller 140 may be configured to recognize an event based on at least one of the user input, the driving speed information, the current position information, the startup on/off information, and the collision information input to the second inputter 113, and store the information regarding the recognized event in the storage 141 together with the information of the obtained image. Particularly, the event may include parking for identifying a parking position, traffic accidents, and a trip. The traffic accidents may include traffic accidents of other vehicles in addition to traffic accidents of the subject vehicle. In addition, the traffic accident of the subject vehicle may include both a traffic accident while driving and a traffic accident while parking.

When the controller 140 stores the information of the obtained image, the controller 140 may be configured to store the information of the obtained image in a database corresponding to the recognized event among a plurality of databases in the storage 141. When the recognized event is the traffic accident, the controller 140 may be configured to perform recording for a predetermined time, and transmit information of the obtained image to the server such as the police station, the fire station, or the emergency medical center. When transmitting the information of the obtained image, the controller 140 may be configured to transmit the time information and the position information together.

When the recognized event is a trip, the controller 140 may be configured to transmit information of the obtained image to the terminal 2 registered in advance, and transmit the time information and position information together when transmitting the obtained image information. The terminal 2 registered in advance may be the terminal for the user who is a vehicle owner or the terminal of the acquaintance of the user (e.g., passenger within the vehicle or other vehicle user). The terminal 2 may be implemented as a user terminal, and the user terminal 2 may be implemented as a computer or a portable terminal capable of connecting to the vehicle 1 via a network.

The computer may include, for example, a notebook, a desktop, a laptop, a tablet personal computer (PC), a slate PC, and the like, each of which is equipped with a WEB Browser. The user terminal 200 may include, for example, a wearable device such as a Personal Communication System (PCS), or the like as a wireless communication device that is guaranteed to be portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and contact lens, or a head-mounted-device (HMD).

When the recognized event is parking, the controller 140 may be configured to transmit information of the obtained image to the user terminal 2, and transmit the time information and position information together when transmitting the obtained image information. The controller 140 may be configured to operate the sound outputter 160 to output information regarding image obtainment, image transmission, and image storage as sound. The controller 140 may be configured to store images obtained from the plurality of cameras in a database corresponding to the plurality of cameras, respectively. For example, the controller 140 may be configured to obtain the image of the front of the vehicle 1, the image of the rear of the vehicle 1, the image of a left direction of the vehicle 1, and the image of the right direction of the vehicle 1. The controller 140 may then be configured to match the obtained front image, the rear image of the vehicle 1, the image of the left side of the vehicle 1, and the image of the right side of the vehicle 1 with the time information, and store them in each database of the storage 141.

The controller 140 may be implemented with a memory configured to store an algorithm to execute operation of the components in the vehicle 1 or data about a program that implements the algorithm, and a processor configured to perform the aforementioned operation using the data stored in the memory. The memory and the processor may be implemented in separate chips. Alternatively, the memory and the processor may be implemented in a single chip.

The storage 141 may be configured to store identification information of the plurality of cameras and position information corresponding to the identification information. The storage 141 may also be configured to store identification information of the camera corresponding to each of the operation signals of a plurality of buttons provided in the second inputter 113. The storage 141 may be configured to store map information, and store a phone number associated with an emergency call and a link address of a web page associated with the police station or the fire station. In particular, the link address of the web page related to the police station or the fire station may be a link for transmitting an accident image.

Additionally, the storage 141 may be configured to store the user's phone number, the user's email, the phone numbers and emails of people registered by the user. In other words, the storage 141 may be configured to store information regarding the transmission target of the image information corresponding to the event. The storage 141 may be configured to store images obtained from the plurality of cameras of the image obtainer 130 in response to a control command of the controller 140. The storage 141 may be configured to store a front database storing the image of the front of the vehicle 1, a rear database storing the image of the rear of the vehicle 1, a left database storing the image of the left side of the vehicle 1, and a right database storing the image of the right direction of the vehicle 1.

The image stored in the storage 141 may be a moving image or a snapshot image. In addition, the images stored in the storage 141 may be classified and stored according to events and dates. The storage 141 may then be configured to delete an image stored according to the control command of the controller 140 and store an image having quality degraded by the controller 140. The storage 141 may be configured to match and store at least one of time information and position information of a time when the image is obtained. The storage 141 may also be configured to match and store information of the recognized object in the obtained image, and match and store driving information and position information of the vehicle 1. The information of the object may include at least one of the type object, speed information, number information, and position information.

Further, the storage 141 may be configured to store a storage period of the image for permanently deleting the stored image. The storage 141 may be configured to store various data for overall operation of the vehicle 1, such as a program for processing or operating the controller 140. The storage 141 may be the memory implemented as a chip separate from the processor associated with the controller 140, and may be implemented as the single chip with the processor. The storage 141 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto.

The communicator 150 may be configured to transmit the image stored in the storage 141 or the image obtained in the image obtainer 130 to the external device 3 in response to the control command of the controller 140. Particularly, the external device 3 may include at least one of the server of the police station or the fire station, the server of the emergency medical center, the user terminal 2 registered in advance, and a terminal of a person registered by the user. The external device 3 may be a telematics server of a vehicle manufacturer, a server of a vehicle service center, a cloud server, and a web hard server.

The communicator 150 may be configured to perform communication between various electronic devices in the vehicle 1, communication with the external device 3, communication with the user terminal 2, and communication with a storage medium. The communicator 150 may include one or more components that enable communication with the controller 140, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module. The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS) module, a time division multiple access (TDMA) module, a long-term evolution (LTE) module, etc.

The communicator 150 may further include a position receiver 151 (see FIG. 3) configured to receive the position information that corresponds to the current position of the vehicle 1. The position receiver 151 may include a Global Positioning System (GPS) signal receiver and a signal processor for processing GPS signals obtained by the GPS signal receiver. The GPS signal receiver may include an antenna for receiving signals of a plurality of GPS satellites. The antenna may be provided the exterior of the vehicle.

The signal processor of the position receiver 151 may include software for obtaining the current position using distance and time information corresponding to the position signals of the plurality of GPS satellites and the outputter configured to output the obtained position information of the vehicle. The position receiver 151 may be configured to transmit the position information regarding the current position to the controller 140. The sound outputter 160 may be configured to output completion information about image obtainment completion and image transmission completion as the sound.

In addition, the sound outputter 160 may be configured to output audio data corresponding to a function being performed as the sound. The function being performed may be the radio function, the audio function corresponding to content reproduction and music reproduction, and the navigation function. The sound outputter 160 may include a speaker. The speaker may be configured to convert an amplified low frequency voice signal into an original sound wave, generate a small wave in the air, and copy the sound wave to output audio data as a sound capable of being heard by the user.

The vehicle 1 may further include an information receiver of the shift lever configured to receive position information of the starter and the shift lever. The starter may be configured to receive a start-on signal of the vehicle 1 and a start-off signal of the vehicle 1, and transmit the startup on/off information corresponding to the received start-on signal and the start-off signal to the controller 140. The information receiver of the shift lever may be configured to receive the operation signal of the shift lever and transmit position information of the stage corresponding to the operation signal of the shift lever corresponding to the received operation signal to the controller 140.

The position at which the shift lever may be operated may include a parking stage P stage, a neutral stage N stage, a forward driving stage D stage, and a reverse driving stage R stage. In other words, the information receiver of the shift lever may be configured to transmit the position information of the parking stage P stage, the neutral stage N stage, the forward driving stage D stage, and the reverse driving stage R stage to the controller 140. The control configuration of the vehicle 1 provided with the image obtainer 130 having four cameras will be described by way of example.

Referring to FIG. 3, the image obtainer 130 of the vehicle 1 may include a first camera 131 configured to obtain the image in a front direction of the vehicle 1, a second camera 132 configured to obtain the image in a rear direction of the vehicle 1, a third camera 133 configured to obtain the image in the left direction of the vehicle 1, and a fourth camera 134 configured to obtain the image in the right direction of the vehicle 1.

The first camera 131 may be mounted on a front window glass of the front of the vehicle 1, but may be mounted on a window inside the vehicle 1 to face the exterior of the vehicle 1, or may be mounted on a room mirror inside the vehicle 1 to face the outside of the vehicle 1. The first camera 131 may be also be mounted in a license plate, a grill, an emblem, a front panel, or a roof panel, to be exposed to the exterior.

The second camera 132 may be mounted in a rear window glass of the rear of the vehicle 1, may be mounted in the window inside the vehicle 1 to face the exterior of the vehicle 1, and may be mounted in a tail gate. The second camera 132 may be mounted in the license plate, the roof panel, the rear panel, or the emblem to be exposed to the exterior. The third camera 133 may be mounted in a left side mirror, a left door, or a left fender. The fourth camera 134 may be mounted in a right side mirror, a right door, or a right fender. In addition, the fourth camera 134 may be mounted around the rear panel, around the emblem, or around the license plate.

The image obtainer 130 may be configured to convert shape information of the object around the vehicle 1 into an electrical image signal. The image obtainer 130 may also be configured to transmit the image signal corresponding to an environment outside the subject vehicle, in particular, the road on which the vehicle 1 is being driven and the objects on the front, rear, left and right sides of the subject vehicle around the subject vehicle, to the controller 140 at the current position of the subject vehicle. The controller 140 may include a front recognizer a1, a rear recognizer a2, a first side recognizer a3, a second side recognizer a4, and an event image obtainer a5.

The front recognizer a1 may be configured to recognize the object in the image of the front of the vehicle 1 obtained by the first camera 131 of the image obtainer 130, recognize information of the recognized object, and recognize a lane. The rear recognizer a2 may be configured to recognize the object in the image of the rear of the vehicle 1 obtained by the second camera 132 of the image obtainer 130, recognize information of the recognized object, and recognize the lane. The first side recognizer a3 may be configured to recognize the object in the image of the left direction of the vehicle 1 obtained by the third camera 133 of the image obtainer 130, recognize information of the recognized object, and recognize the lane.

The second side recognizer a4 may be configured to recognize the object in the image of the right direction of the vehicle 1 obtained by the fourth camera 134 of the image obtainer 130, recognize information of the recognized object, and recognize the lane. The results and information recognized by the various recognizers may be used to recognize the traffic accident of another vehicle and the traffic accident of the subject vehicle, recognize a parking lot, or recognize a sign.

The event image obtainer a5 may be configured to obtain object information around the subject vehicle from the objects and the object information recognized by the front recognizer a1, the rear recognizer a2, the first side recognizer a3, and the second side recognizer a4, respectively. The object information may include at least one of the type of object, the speed information, the number information, text information, and the position information. The type of object may include the person, another vehicle, the road lane, the sign, and the like.

The event image obtainer a5 may also be configured to obtain information regarding the current position of the vehicle 1 through at least one of the text information and position information recognized by each recognizer. The event image obtainer a5 may be configured to obtain the speed of the object based on a distance change with the object detected by the distance detector and the driving speed of the subject vehicle, and obtain the position of the object from the camera from which the image of each object is obtained.

Additionally, the event image obtainer a5 may be configured to determine whether the traffic accident has occurred in another vehicle based on a change in the position of another vehicle among the objects, and in response to determining that the traffic accident of another vehicle has occurred, the event image obtainer a5 may be configured to obtain the image obtained by the camera mounted at the position corresponding to the position of the another vehicle in which the traffic accident occurs as the event image and operate the storage 141 of the obtained event image. The event image obtainer a5 may be configured to obtain the numbers of license plates of other vehicles located in the front and rear of the subject vehicle from the images recognized by each image recognizer.

The event image obtainer a5 may then be configured to determine whether there is the traffic accident with another vehicle based on the distance change between another vehicle and the subject vehicle. In response to determining that the traffic accident, the event image obtainer a5 may be configured to obtain the image obtained by the camera mounted at the position corresponding to the position where the traffic accident occurs as the event image and operate the storage of the obtained event image.

Further, the event image obtainer a5 may be configured to determine whether the current position is the parking lot based on the current position information received by the position receiver 151, and in response to determining that the parking lot is obtained, the event image obtainer a5 may be configured to obtain the image obtained from the first and second cameras 131 and 132 of the plurality of cameras as the event image, store the obtained event image, and transmit the obtained event image to the user terminal 2. The event image obtainer a5 may be configured to determine the user's parking intention based on the start-off signal, the position information of the shift lever, and on/off information of an electronic parking button.

When the collision information is received via the collision detector 121 when the vehicle 1 is in a parking state, the event image obtainer a5 may be configured to activate the plurality of cameras, obtain the image obtained using the plurality of cameras as the event image, obtain the image for the predetermined time (i.e., performing recording), operate the storage of the obtained event image, and transmit the obtained event image to the user terminal 2. When the collision information is received via the collision detector 121 when the state of the vehicle 1 is in the parking state, the event image obtainer a5 may be configured to identify the position where the collision occurred based on the received collision information, activate the camera mounted at the position corresponding to the identified position, obtain the image obtained by the activated camera as the event image, operate the storage of the obtained event image, and transmit the obtained event image to the user terminal 2.

The event image obtainer a5 may be configured to transmit the obtained event image to the servers of the police station, the fire station, and the emergency medical center. When the image obtainment command is received via the second inputter 113, the event image obtainer a5 may be configured to obtain the image obtained through the plurality of cameras as the event image and operate the storage of the obtained event image. When the image obtainment command is received via the second inputter 113, the event image obtainer a5 may be configured to identify the position information of the camera included in the received image obtainment command, obtain the image obtained using the camera having the identified position information as the event image, and operate the storage of the obtained event image.

When the image obtainment command is received via the second inputter 113, the event image obtainer a5 may be configured to identify the position information and the event information of the camera included in the received image obtainment command, obtain the image obtained using the camera having the identified position information as the event image, and store the obtained event image and the event name together. The event image obtainer a5 may be configured to determine whether the current position is a region of interest based on the navigation information and the position information of the current position received by the position receiver. In response to determining that the current position is the region of interest, the event image obtainer a5 may be configured to store the image obtained from the first camera 131 as the event image along with the position information and the time information.

Additionally, the event image obtainer a5 may be configured to store the image obtained based on the event information in the database corresponding to each of the plurality of events. In other words, the event image obtainer a5 may be configured to store the obtained image information in a first database when the event is a parking event, store the obtained image information in a second database when the event is a traffic accident event of another vehicle, store the obtained image information in a third database when the event is the traffic accident event of the subject vehicle while the vehicle is being driven, store the obtained image information in a fourth database when the event is the traffic accident event of the subject vehicle while parking is being performed, and store the obtained image information in a fifth database when the event is a trip event.

The storage 141 may include the plurality of databases for storing information regarding the image corresponding to each of the plurality of events. For example, the storage 141 may include a first database 141a for storing image information of the parking event, a second database 141b for storing image information of the traffic accident event of another vehicle, a third database 141c for storing image information of the traffic accident event of the subject vehicle while driving, a fourth database 141d for storing image information of the traffic accident event of the subject vehicle while parking, and a fifth database 141e for storing image information of the trip even. At least one component may be added or deleted corresponding to performance of the components of the vehicle 1 illustrated in FIGS. 1 to 3. In addition, it will be readily understood by those skilled in the art that mutual positions of the components may be changed to correspond to performance or structure of a system.

Figure 4A:
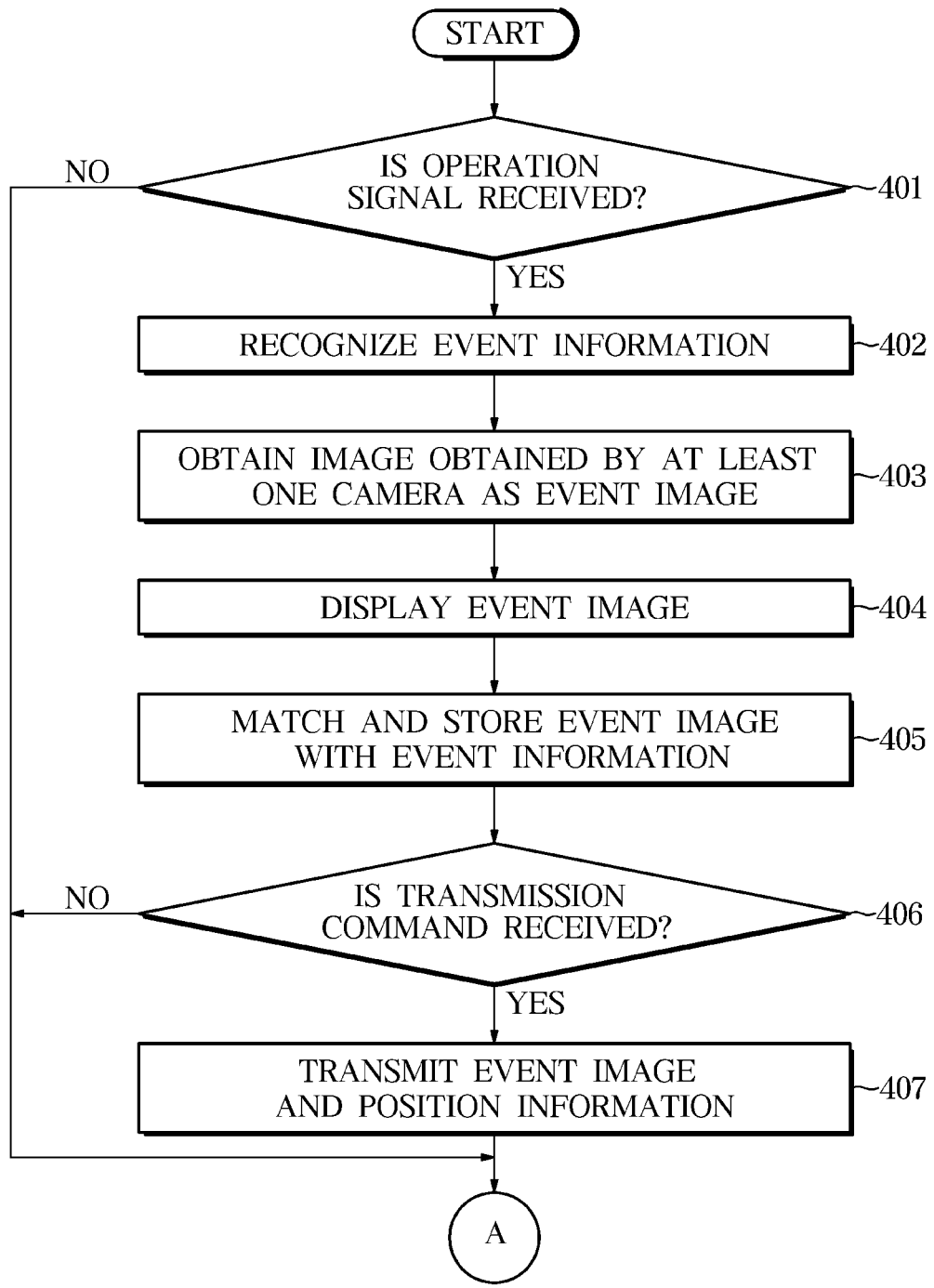
FIGS. 4A and 4B are control flowcharts of a vehicle according to exemplary embodiments of the disclosure.
Figure 4B:
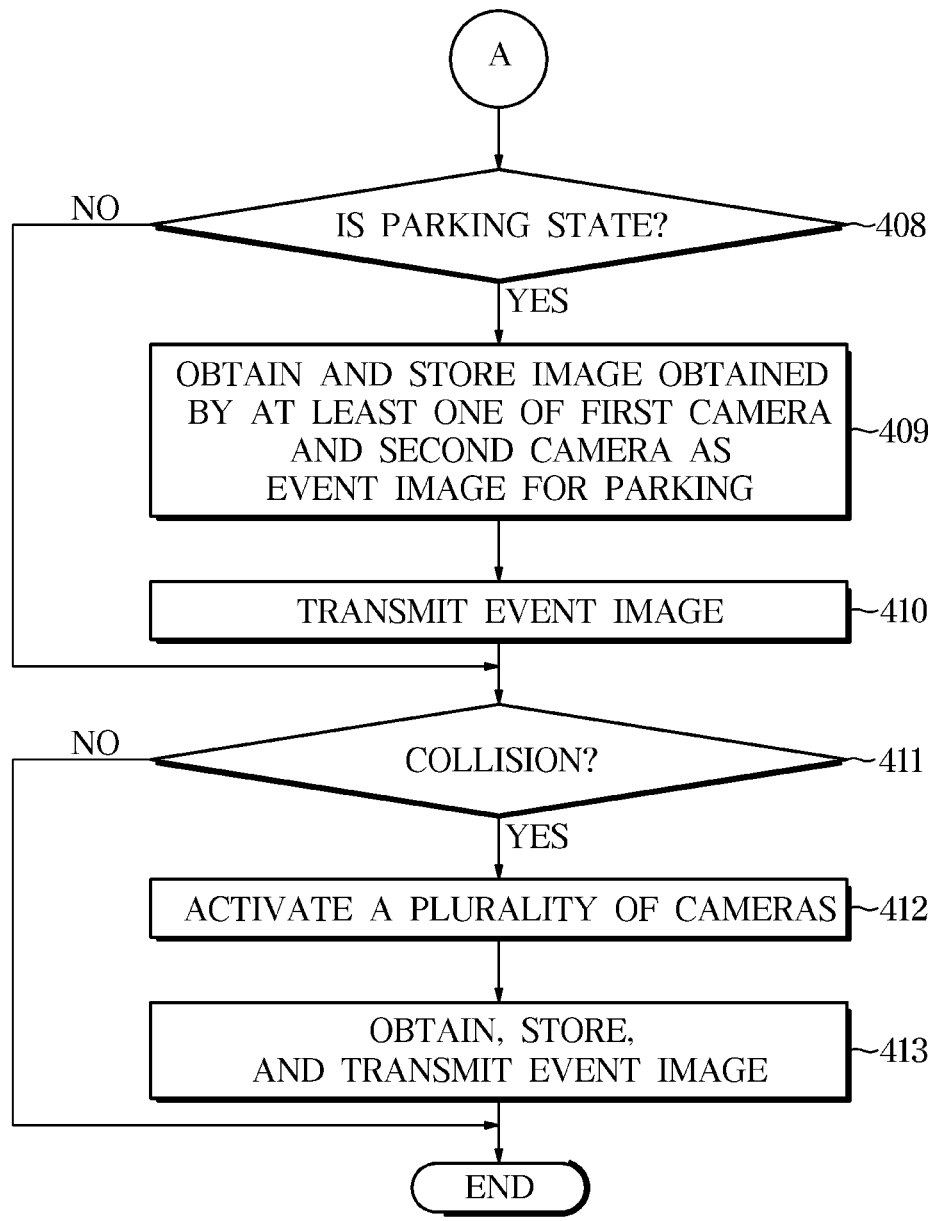

FIGS. 4A and 4B are control flowcharts of a vehicle according to exemplary embodiments of the disclosure, which will be described with reference to FIGS. 5 to 8. When the vehicle 1 is turned on, the controller (of the vehicle) may be configured to activate operations of various electronic devices such as the vehicle terminal 110, the second inputter 113, the second display 114, the detector 120, the image obtainer 130, the position receiver 151, and the sound outputter 160.

When the navigation mode is selected and the destination information is input, the vehicle 1 may be configured to identify the current position, search the path from the starting point of the current position to the destination, generate the navigation information by matching the searched path with the map information, display the map information matching the path through the first display 112 of the vehicle terminal 110, and output the path guidance information through the first display 112 and the sound outputter 160.

The vehicle 1 may be configured to display the current position while driving through the first display 112 of the vehicle terminal 110, obtain the driving speed while driving, display the obtained driving speed through the first display 112, detect the obstacle around the vehicle 1, obtain the distance from the detected obstacle, and output warning information through at least one of the first display 112 and the sound outputter 160 when the obtained distance to the obstacle is less than a reference distance.

In addition, the vehicle 1 may be configured to obtain the image around the vehicle 1 using the plurality of cameras 131, 132, 133, and 134 provided in the image obtainer 130 while the vehicle is being driven, and store the obtained image. In particular, the vehicle 1 may be configured to store the time information when the image is obtained and the position information of the vehicle 1 together in the storage 141. For example, the vehicle 1 may be configured to obtain the image of the front while driving, store the information of the obtained front image, obtain the image of first and second sides, store the information of the obtained first and second side image, obtain the image of the rear, and store information of the obtained rear image.

When the second inputter 113 is operated by the user while driving and the operation signal is received from the second inputter 113 (401), the vehicle 1 may be configured to recognize the received operation signal as an event generation signal, recognize the event information based on the received operation signal (402), and obtain the image obtained using at least one camera as the event image (403). Particularly, the received operation signal may include a signal for at least one of identification information of the operated second inputter 113, a number of operations of the operated second inputter 113, and an operation direction of the operated second inputter 113.

The vehicle 1 may also be configured to recognize identification information of the camera based on the received operation signal. When the vehicle 1 obtains the image obtained using at least one camera as the event image, the vehicle 1 may be configured to obtain the image obtained by the camera having the recognized identification information as the event image, display the obtained event image through the first display 112 of the vehicle terminal 110 (404), match and store image information about the displayed event image with the recognized event information (405), and transmit the stored image information to the external device 3 or the terminal 2 registered in advance.

When displaying the obtained event image, the vehicle 1 may be configured to automatically store the image information of the event image. In addition, when displaying the obtained event image, when the operation signal for a recording command (i.e., storage command) is received via the second inputter 113, the vehicle 1 may be configured to store the image information about the displayed event image. For example, the operation signal for the recording command may be the operation signal of the passing switch.

When transmitting the obtained event image, when the operation signal for the transmission command is received via the second inputter 113 (406), the vehicle 1 may be configured to transmit the image information about the displayed event image to at least one of the external device 3 or the terminal 2 registered in advance (407). For example, the operation signal for the transmission command may be the operation signal for an emergency button. Recognizing as the event generation signal may include recognizing as the event generation signal for the traffic accident of another vehicle.

In other words, the vehicle 1 may be configured to recognize the operation signal of the second inputter 113 as the event generation signal for the traffic accident of another vehicle, display the image obtained using one or more cameras on at least one of the first display 112 and the cluster of the vehicle terminal 110 as the event image for the traffic accident of another vehicle, store the image in the second database, and transmit the image to the external device 3. In addition, the vehicle 1 may be configured to recognize the operation signal of the second inputter 113 as the event generation signal for the trip, depending on the user's setting or the vehicle manufacturing setting. In particular, the vehicle 1 may be configured to display the image obtained using one or more cameras on at least one of the first display 112 and the cluster of the vehicle terminal 110 as the event image of the trip, store the image in the fifth database, and transmit the image to the user terminal 2 or the external device 3.

When the operation signal of the second inputter 113 is received, the vehicle 1 may be configured to recognize whether the operation signal of the second inputter 113 is the event generation signal for the traffic accident of another vehicle or the event generation signal for the trip based on the current position information received by the position receiver 151. For example, when the second inputter 113 is operated, the vehicle 1 may be configured to determine whether the current position of the vehicle 1 is the road based on the current position information received by the position receiver 151. When the current position of the vehicle 1 is determined to be the road, the vehicle 1 may be configured to recognize the operation signal of the second inputter 113 as the event generation signal for the traffic accident of another vehicle. In response to determining that the current position is a tourist destination or the region of interest, the vehicle 1 may be configured to recognize the operation signal of the second inputter 113 as the event generation signal for the trip.

When the second inputter 113 includes a left multi-function switch and a right multi-function switch, the vehicle 1 may be configured to recognize the event generation signal for the traffic accident of another vehicle when the operation signal is received via the left multi-function switch, and recognize the event generation signal for the trip when the vehicle 1 receives the operation signal via the right multi-function switch. For example, when a first operation signal is received from the left multi-function switch, the vehicle 1 may be configured to display operation information of the third camera 133 through the cluster. When a confirmation signal is received, the vehicle 1 may be configured to display the image of the third camera 133 on the vehicle terminal 110 and simultaneously store the image. When a release signal is received, the vehicle 1 may be configured to stop image obtainment and storage of the third camera 133. In particular, the image information obtained by the third camera 133 may be stored as the event image of the traffic accident of another vehicle.

When a second operation signal is received from the left multi-function switch, the vehicle 1 may be configured to display operation information of the fourth camera 134 through the cluster. When the confirmation signal is received, the vehicle 1 may be configured to display the image of the fourth camera 134 on the vehicle terminal 110 and simultaneously store the image. When the release signal is received, the vehicle 1 may be configured to stop image obtainment and storage of the fourth camera 134. In particular, the image information obtained by the fourth camera 134 may be stored in the second database as the event image of the traffic accident of another vehicle.

Figure 5:
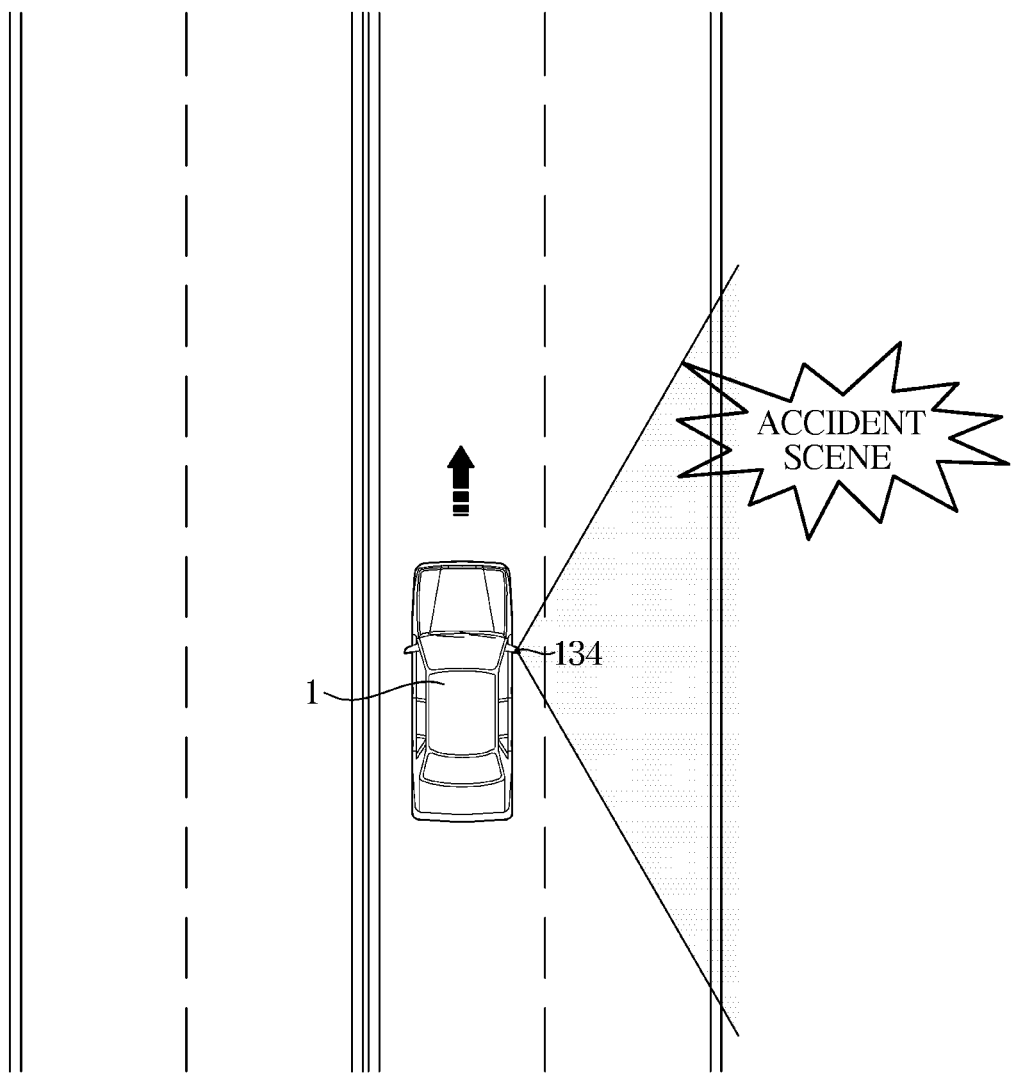
FIGS. 5 to 8 are views of obtaining images of a vehicle according to exemplary embodiments of the disclosure.

Referring to FIG. 5, when the traffic accident occurs in the right direction of the vehicle 1 while the vehicle is being driven, when the second operation signal is received from the left multi-function switch, the vehicle 1 may be configured to obtain the image obtained by the fourth camera 114 mounted in the right side mirror as the event image of the traffic accident of another vehicle.

The first operation signal may be a signal generated when a movement direction of the left multi-function switch is in a downward direction, the second operation signal may be a signal generated when the movement direction of the left multi-function switch is in an upward direction, the confirmation signal may be a signal generated when the movement direction of the left multi-function switch is in a pull direction, and the release signal may be a signal generated when the movement direction of the left multi-function switch is a push direction.

When the first operation signal is received from the right multi-function switch, the vehicle 1 may be configured to display operation information of the third camera 133 through the cluster. When the confirmation signal is received, the vehicle 1 may be configured to display the image of the third camera 133 on the vehicle terminal 110 and simultaneously store the image. When the release signal is received, the vehicle 1 may be configured to stop image obtainment and storage of the third camera 133. In particular, the image information obtained by the third camera 133 may be stored in the fifth database as the event image for the trip. In addition, when storing the event image for the trip, the navigation information may be stored together, and the position information and time information may be stored together.

When the second operation signal is received from the right multi-function switch, the vehicle 1 may be configured to display operation information of the fourth camera 134 through the cluster. When the confirmation signal is received, the vehicle 1 may be configured to display the image of the fourth camera 134 on the vehicle terminal 110 and simultaneously store the image. When the release signal is received, the vehicle 1 may be configured to stop image obtainment and storage of the fourth camera 134. In particular, the image information obtained by the fourth camera 134 may be stored as the event image for the trip.

Figure 6:
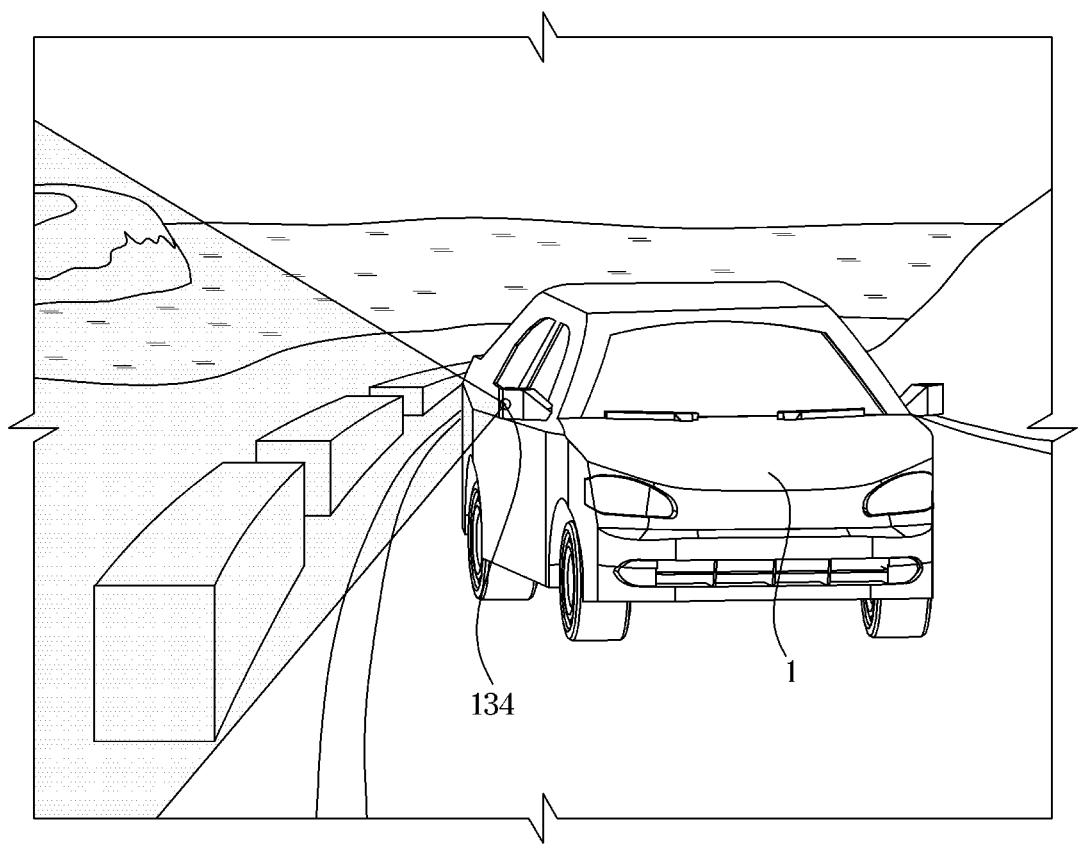

Referring to FIG. 6, when the second operation signal is received from the right multi-function switch while driving, the vehicle 1 may be configured to obtain the image obtained by the fourth camera 134 mounted in the right side mirror as the event image for the trip and store the obtained event image. In addition, when storing the event image for the trip, the vehicle 1 may be configured to match and store the navigation information at the time when the event image is obtained with the event image.

The first operation signal may be a signal generated when a movement direction of the right multi-function switch is in a downward direction, the second operation signal may be a signal generated when the movement direction of the right multi-function switch is in an upward direction, the confirmation signal may be a signal generated when the movement direction of the right multi-function switch is in a pull direction, and the release signal may be a signal generated when the movement direction of the right multi-function switch is a push direction.

The vehicle 1 may be configured to receive camera identification information and event information for image obtainment via the second inputter 113. For example, when the image obtainment command of the first camera 131 and the event information of the traffic accident of another vehicle are received via the second inputter 113, the vehicle 1 may be configured to display the image obtained using the first camera 131, store the obtained image information in the second database, and transmit the image to the external device 3.

When the vehicle stores the obtained image information in the second database and transmits the image to the external device, the vehicle 1 may be configured to store and transmit the time information together with the position information of the vehicle 1 (e.g., information about the position of the traffic accident). In addition, after performing image processing on the obtained event image, the vehicle 1 may be configured to compress and transmit the processed event image when transmitting the image information. As another example, when the image obtainment command of the second camera 132 and the event information of the trip are received via the second inputter 113, the vehicle 1 may be configured to display the image obtained using the second camera 132, store the obtained image information in the fifth database, and transmit the image to the terminal 2 registered in advance.

The vehicle 1 may be configured to store and transmit the time information and position information together when storing the obtained image information in the fifth database and transmitting the image information to the external device 3. When the vehicle 1 receives the operation signal of the second inputter 113 even in a parked or stopped state, the vehicle 1 may be configured to store the image obtained using at least one camera as the event image and transmit the image to the terminal 2 registered in advance.

The vehicle 1 may be configured to process the image obtained using at least one camera of the plurality of cameras while the vehicle is being driven to tune brightness, sharpness, and color of the image, and to remove noise. The vehicle 1 may be configured to analyze the processed image, recognize the object such as the lane, another vehicle, the sign, a traffic light, a pedestrian (i.e., person), a roadside tree, and obtain information about the recognized object. The obtaining information of the object may include obtaining the position of the object based on the type of the object and the subject vehicle, and further include obtaining the speed of the object.

The vehicle 1 may be configured to determine whether the traffic accident of another vehicle occurs based on the information of the obtained object, and in response to determining that the traffic accident of another vehicle occurs, the vehicle 1 may be configured to identify the camera that obtains the image of the traffic accident among the plurality of cameras, and store the image obtained from the identified camera as the event image. The vehicle 1 may be configured to determine whether the current position is the region of interest based on the navigation information and the current position information. When the vehicle 1 determines that the current position is the region of interest, the vehicle 1 may be configured to store the image obtained using at least one camera as the event image for the trip event. The navigation information may include the map information, the path information, the path guidance information, and the like. The map information may include a road name, a road number, and position information of the road.

The vehicle 1 may be configured to receive the collision information output by the collision detector 121 while the vehicle is being driven and determine whether the subject vehicle has the traffic accident based on the received collision information. When a magnitude of the impact corresponding to the collision information is greater than or equal to a reference magnitude, the vehicle 1 may be configured to determine that the subject vehicle is the traffic accident, store the image obtained through the camera provided at a position corresponding to the collision occurred as the event image of the traffic accident of the subject vehicle, and transmit the event image to the external device 3.

In response to determining that the vehicle 1 is in the parking state (408), the vehicle 1 may be configured to obtain the image by operating at least one of the first camera 131 and the second camera 132, store the obtained image as the event image for parking (409), and transmit the image to the terminal 2 registered in advance (410). In addition, when the transmission command is input by the user, the vehicle 1 may be configured to transmit the event image to the terminal 2 registered in advance.

Figure 7:
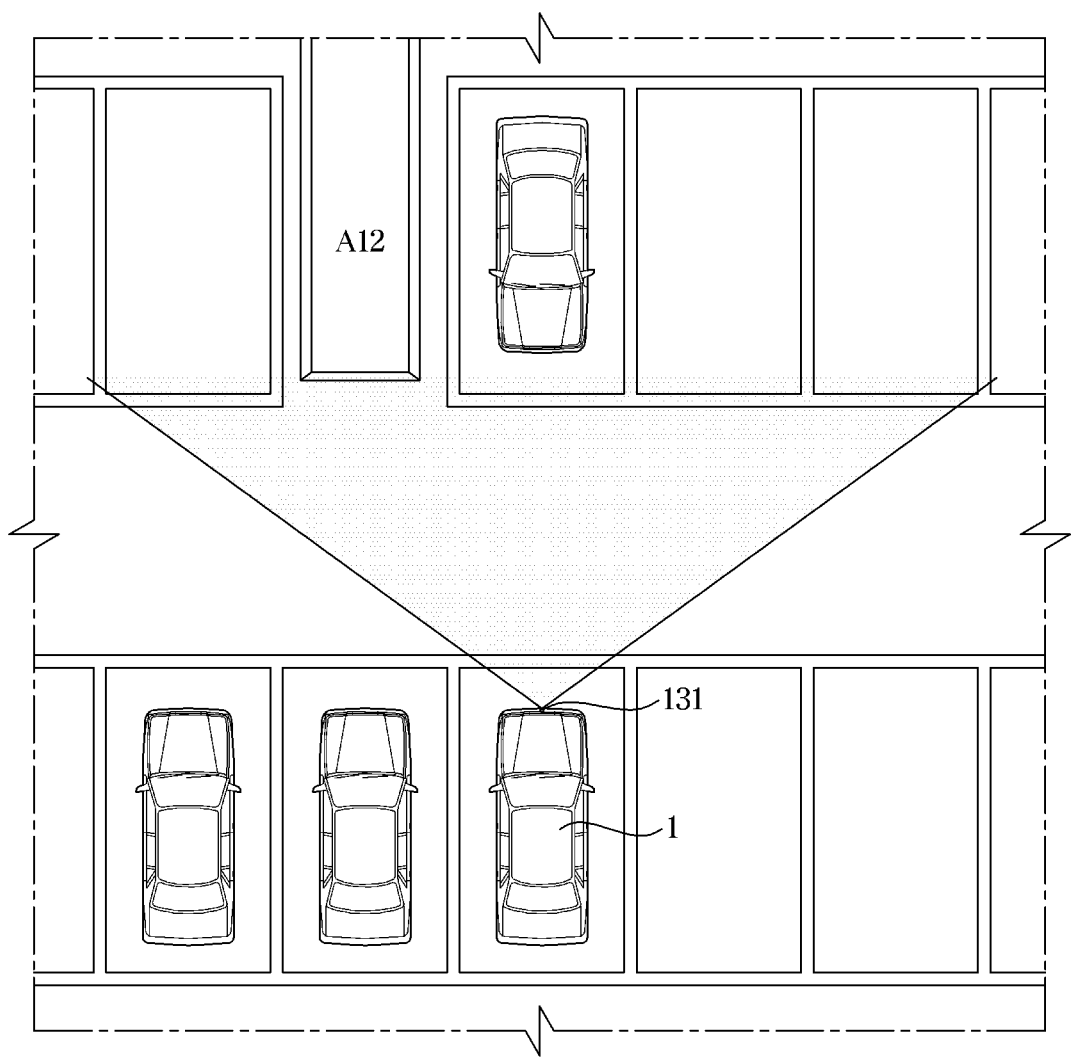

Referring to FIG. 7, when the vehicle 1 is in the parking state, the vehicle 1 may be configured to obtain the image obtained by the first camera 131 as the event image for parking, store the obtained event image, and transmit the image to the terminal 2 registered in advance. In particular, the obtained event image may be an image having information regarding the parking position. In other words, the vehicle 1 may be configured to obtain the image having information regarding the parking position, and transmit the image having the information about the parking position to the user terminal 2 to allow a user to more easily locate the vehicle 1 at a later point in time by checking the user terminal 2.

The determining of the parking state may include determining that the vehicle 1 is in the parking state when at least one of a state where the driving speed is 0, a start-off state, a state where the electronic parking button is on, a state where the shift lever is in the reverse travel stage R, and a state where the shift lever is in the parking stage P is satisfied. The determining of the parking state may include determining that the vehicle 1 is in the parking state when text information in the image obtained through the first camera 131 is parking lot information. Additionally, the determining of the parking state may include recognizing the current position based on the position information received by the position receiver 151 and determining that the vehicle 1 is in the parking state when the recognized current position is the parking lot or the destination.

When the vehicle 1 receives the image obtainment command and the event information regarding the parking via the second inputter 113, the vehicle 1 may be configured to operate at least one of the first camera 131 and the second camera 132 to obtain the image, store the obtained image as the event image for parking, and transmit the image to the terminal 2 registered in advance. In addition, the vehicle 1 may be configured to receive information of the terminal 2 for transmitting the event image through the first inputter 111. When the vehicle 1 receives the image obtainment command via the second inputter 113 while parking, the vehicle 1 may be configured to operate at least one of the first camera 131 and the second camera 132 to obtain the image, store the obtained image as the event image for parking, and transmit the image to the terminal 2 registered in advance.

When the collision information output by the collision detector 121 is received while parking and is determined to be the collision (411), the vehicle 1 may be configured to determine whether the subject vehicle is in the traffic accident based on the received collision information. In particular, when the magnitude of the impact corresponding to the collision information is greater than the reference magnitude, the vehicle 1 may be configured to determine that the impact is the traffic accident of the subject vehicle, activate the plurality of cameras (412), obtain all the images obtained by the plurality of cameras as the event image of the traffic accident of the subject vehicle, store the obtained event image, and transmit the obtained event image to the terminal 2 registered in advance (413). In addition, the vehicle 1 may be configured to store the image obtained using the camera mounted at the position corresponding to a collision point as the event image of the traffic accident of the subject vehicle, and transmit the event image to the external device 3 and the terminal 2 registered in advance.

Figure 8:
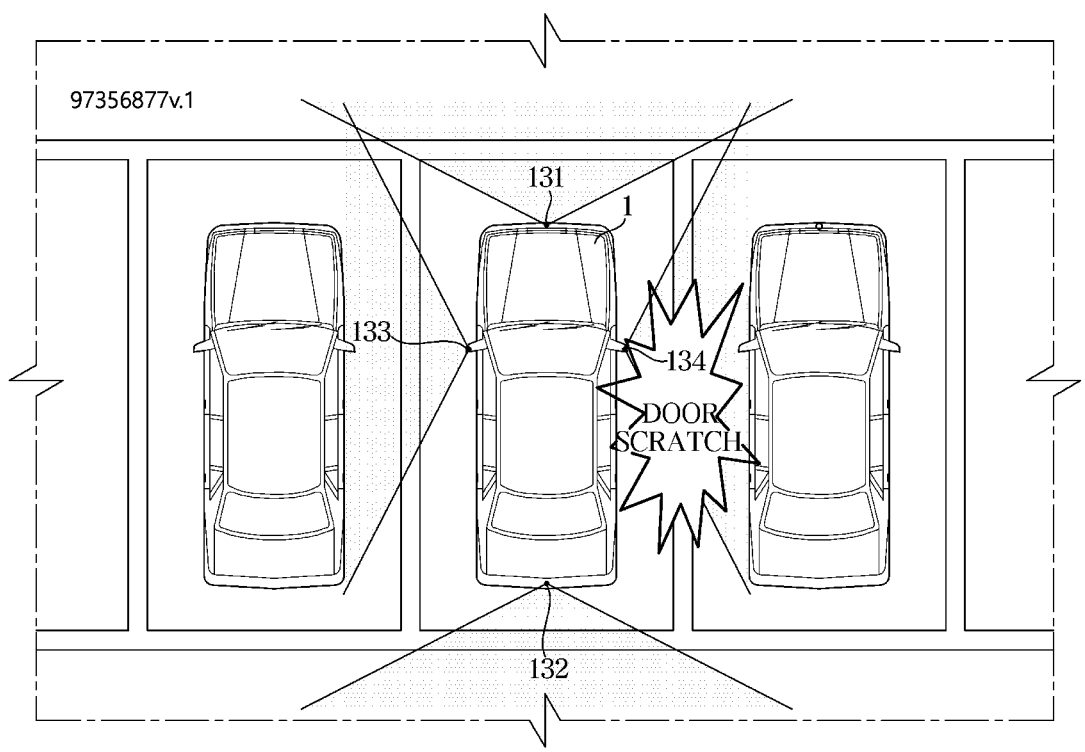

Referring to FIG. 8, when the collision occurs while the vehicle 1 is parked, the vehicle 1 may be configured to activate all the plurality of cameras to obtain images of the front, rear, left, and right directions of the vehicle 1 as the event images and transmit the obtained event images to the user terminal 2 to prevent another vehicle or another person from damaging the subject vehicle.

As is apparent from the above description, the exemplary embodiments of the disclosure may identify the event corresponding to state information, surrounding information of the vehicle, such as driving, parking of the vehicle, and select at least one camera corresponding to the identified event of the plurality of cameras mounted in the vehicle, store the event image by automatically storing the image of the selected camera as the event image for the identified event, it may be possible to rapidly and conveniently search for the desired image in the further.

In addition, by dividing and storing the images obtained from the plurality of cameras as event images for various events, it may be possible to search for the image suitable for the purpose of use according to the needs of the user. Accordingly, the disclosure may use the stored image for various purposes, thereby increasing the utilization of the image. The disclosure may increase the degree of freedom of the user by obtaining the image at a desired time and location according to the user input. When traveling using the vehicle, the disclosure may automatically generate a travel image after the trip, thereby improving the user convenience, and providing a personalized service by allowing the sharing images of places to be left or wanted to be shared with others. The disclosure may improve the merchandise of the vehicle, increase the user's satisfaction, improve the user convenience and reliability, and ensure the competitiveness of the product.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented as a non-transitory computer-readable recording medium. The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, etc.

Exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle, comprising:
a plurality of cameras each having identification information, configured to obtain images in different directions;
an inputter configured to receive a user input;
a controller configured to:
recognize the identification information and event information of each camera based on the received user input;
obtain an image obtained using at least one camera as an event image based on the recognized identification information; and
match image information of the obtained event image with the recognized event information; and
a storage configured to store the image information and the event information in response to a control command of the controller,
wherein the plurality of cameras include a first camera configured to obtain a front image and a second camera configured to obtain a rear image, and
wherein the controller is configured to obtain the image obtained using at least one of the first camera and the second camera as the event image for parking when the vehicle is in a parking state.

2. The vehicle according to claim 1, wherein the storage includes a plurality of databases and the controller is configured to store the image information in a database among the plurality of databases having the recognized event information.

3. The vehicle according to claim 1, further comprising:
a terminal including a display and a cluster,
wherein the controller is configured to:
when the received user input is an image obtainment command, obtain the image obtained using one or more cameras of the plurality of cameras as the event image;
operate the cluster to display the operation information of the camera that obtained the event image;
operate the terminal to display the obtained event image when the received user input is an image storage command; and
store the event image displayed on the terminal.

4. The vehicle according to claim 1, further comprising:
a position receiver configured to receive position information corresponding to a current position,
wherein the controller is configured to:
identify time information when storing image information of the event image; and
match and store at least one of the identified time information and the received position information with the image information.

5. The vehicle according to claim 1, wherein the inputter includes at least one of a left multi-function switch and a right multi-function switch mounted around a steering wheel.

6. The vehicle according to claim 1, wherein the controller is configured to determine that the vehicle is in the parking state when a shift lever is positioned at a parking stage or an engine is turned off.

7. The vehicle according to claim 1, further comprising:
a collision detector configured to output collision information about collision detection,
wherein the controller is configured to:
when the collision information is received from the collision detector in the parking state, activate the plurality of cameras;
obtain the image for a predetermined time through the plurality of cameras; and
store the image obtained for the predetermined time as the event image.

8. The vehicle according to claim 7, further comprising:
a communicator configured to communicate with a terminal registered in advance,
wherein the controller is configured to transmit the image obtained for the predetermined time to the terminal.

9. The vehicle according to claim 1, wherein the plurality of cameras include a third camera configured to obtain a left image and a fourth camera configured to obtain a right image, and when the received event information is event information about a traffic accident of another vehicle, the controller is configured to obtain the image obtained through the camera corresponding to the recognized identification information of the third camera and the fourth camera as the event image.

10. The vehicle according to claim 1, wherein the plurality of cameras include a third camera configured to obtain a left image and a fourth camera configured to obtain a right image, and when the received event information is event information about a trip, the controller is configured to obtain the image obtained through the camera corresponding to the recognized identification information of the third camera and the fourth camera as the event image.

11. The vehicle according to claim 7, further comprising:
a communicator configured to communicate with an external device,
wherein the controller is configured to transmit the obtained event image to the external device.

12. A vehicle, comprising:
a plurality of cameras having different viewing angles with respect to front, rear, left and right directions of the vehicle;
a collision detector configured to output collision information about collision detection,
a communicator configured to communicate with at least one of an external device and a user terminal;
a controller configured to:
obtain an image obtained using the cameras having the front or rear viewing angle as an event image for parking when the vehicle is in a parking state;
activate the plurality of cameras when the collision information is received from the collision detector while parking is being performed; and
obtain the image obtained using the plurality of cameras as an event image for a traffic accident; and
a storage having a plurality of databases configured to store the event image for the parking and the event image for the traffic accident.

13. The vehicle according to claim 12, wherein the communicator is configured to receive position information corresponding to a current position, and to communicate with the external device, wherein the controller is configured to:
analyze images obtained by the plurality of cameras to determine whether there is the traffic accident of a second vehicle; and in response to determining that the traffic accident of the second vehicle has occurred, match the obtained image with the received position information and transmit the obtained image to the external device.

14. The vehicle according to claim 12, further comprising:
wherein the communicator is configured to receive position information corresponding to a current position, and to communicate with the user terminal,
wherein, in response to determining that the current position is a region of interest based on the received position information, the controller is configured to match the image obtained using at least one of the plurality of cameras with the received position information and transmit the image to the user terminal.

15. A method of controlling a vehicle, the vehicle including a plurality of cameras having different viewing angles with respect to front, rear, left and right directions, the method comprising:
in response to receiving an image obtainment command via an inputter, obtaining, by a controller, an image obtained by the cameras having the viewing angle with respect to at least one of left and right sides as an event image of a traffic accident of another vehicle;
transmitting, by the controller, the event image of the obtained traffic accident of a second vehicle to an external device; and
when the vehicle is in a parking state, obtaining, by the controller, the image obtained by the cameras having the viewing angle with respect to at least one of the front and rear as the event image for parking, and transmitting the event image for parking to a user terminal registered in advance.

16. The method according to claim 15, further comprising:
in response to receiving the image obtainment command, displaying, by the controller, information of the cameras configured to obtain the event image of the traffic accident of the second vehicle; and
in response to receiving an image storing command via the inputter, displaying the event image of the traffic accident of the second vehicle through the display of a vehicle terminal, and storing, by a storage, image information of the displayed event image.

17. The method according to claim 15, further comprising:
storing, by the storage, image information of the event image of the traffic accident of the second vehicle or the event image of the parking, respectively; and
matching and storing, by the controller, time information of a time point at which each event image is obtained and the position information of the vehicle with the image information when storing the image information.

18. The method according to claim 15, further comprising:
determining, by the controller, the parking state when a shift lever is positioned at a parking stage or an engine is turned off.

19. The method according to claim 15, further comprising:
in response to receiving collision information from a collision detector while parking is being performed, activating, by the controller, the plurality of cameras;
obtaining, by the controller, images obtained using the plurality of cameras as the event image of the traffic accident of the vehicle;
storing, by the storage, the event image of the traffic accident of the vehicle; and
transmitting, by the controller, the event image of the traffic accident of the vehicle to the user terminal registered in advance.

* * * * *